(12) United States Patent
Crawford et al.

(10) Patent No.: US 9,891,849 B2
(45) Date of Patent: Feb. 13, 2018

(54) ACCELERATED RECOVERY IN DATA REPLICATION ENVIRONMENTS

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 15/098,355

(22) Filed: Apr. 14, 2016

(65) Prior Publication Data

US 2017/0300244 A1 Oct. 19, 2017

(51) Int. Cl.
G06F 3/06 (2006.01)

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
None
See application file for complete search history.

(56) References Cited

U.S. PATENT DOCUMENTS 7,386,664 B1 * 6/2008 Roy ................... G06F 11/2082
711/114
7,778,976 B2 8/2010 D'Souza et al.
8,560,886 B1 10/2013 Kekre et al.
2002/0194442 A1 12/2002 Yanai et al.
(Continued)

FOREIGN PATENT DOCUMENTS

| IL | WO2014170810 A1 | 10/2014 |
|---|---|---|
| WO | WO2008028803 A2 | 3/2008 |
| WO | WO2008084007 A1 | 7/2008 |

OTHER PUBLICATIONS

Brooks, Charlotte, et al., "IBM System Storage Business Continuity: Part 2 Solutions Guide," IBM Redbook, Feb. 4, 2007.
(Continued)

*Primary Examiner* — Mano Padmanabhan
*Assistant Examiner* — Jean Edouard
(74) *Attorney, Agent, or Firm* — Nelson and Nelson; Daniel P. Nelson; Alexis V. Nelson

(57) ABSTRACT

A method for accelerating recovery in a data replication environment includes maintaining a secondary out-of-sync bitmap for a secondary volume. The secondary out-of-sync bitmap indicates which storage elements on the secondary volume are not synchronized with storage elements on a primary volume. The method further generates, for the primary volume, a tracking bitmap indicating which storage elements on the primary volume need to be updated with data from the secondary volume. This tracking bitmap is initialized with values from the secondary out-of-sync bitmap. Upon receiving a write from the secondary volume to a storage element on the primary volume, the method resets the corresponding bit in the tracking bitmap. Upon receiving a write from a host system to a storage element on the primary volume, the method also resets the corresponding bit in the tracking bitmap. A corresponding system and computer program product are also disclosed.

20 Claims, 8 Drawing Sheets

(56) References Cited

U.S. PATENT DOCUMENTS

| | | | |
|---|---|---|---|
| 2005/0081091 A1* | 4/2005 | Bartfai | G06F 11/2058 714/6.31 |
| 2005/0193179 A1* | 9/2005 | Cochran | G06F 11/2058 711/162 |
| 2006/0259721 A1 | 11/2006 | Ohran | |
| 2008/0065843 A1* | 3/2008 | Bartfai | G06F 11/2058 711/162 |
| 2008/0229038 A1* | 9/2008 | Kimura | G06F 11/2066 711/162 |
| 2009/0043979 A1* | 2/2009 | Jarvis | G06F 11/2064 711/162 |
| 2009/0249116 A1 | 10/2009 | Bartfai et al. | |
| 2009/0300304 A1* | 12/2009 | Boyd | G06F 17/30575 711/162 |
| 2010/0275055 A1 | 10/2010 | Edel et al. | |
| 2010/0325500 A1 | 12/2010 | Bashir et al. | |
| 2011/0208694 A1* | 8/2011 | Bitar | G06F 11/2058 707/610 |
| 2013/0262799 A1* | 10/2013 | Saito | G06F 3/0613 711/161 |
| 2013/0311719 A1 | 11/2013 | Doedline, Jr. et al. | |
| 2014/0108345 A1* | 4/2014 | Brown | G06F 17/30575 707/624 |
| 2014/0108753 A1* | 4/2014 | Benhase | G06F 17/30575 711/162 |
| 2014/0108756 A1* | 4/2014 | Brown | G06F 3/0619 711/162 |
| 2014/0344526 A1* | 11/2014 | Brown | G06F 12/0868 711/141 |

OTHER PUBLICATIONS

Jianfeng, Zhu, et al., "A Duplicate-Aware Data Replication", Japan-China Joint Workshop on Frontier of Computer Science and Technology, IEEE, Dec. 2008.

List of IBM Patents or Patent Applications Treated as Related.

* cited by examiner

ACCELERATED RECOVERY IN DATA REPLICATION ENVIRONMENTS

BACKGROUND

Field of the Invention

This invention relates to systems and methods for accelerating recovery in data replication environments.

Background of the Invention

In data replication environments such as Peer-to-Peer-Remote-Copy ("PPRC") or Extended Remote Copy ("XRC") environments, data is mirrored from a primary storage device to a secondary storage device to maintain two consistent copies of the data. The primary and secondary storage devices may be located at different sites, perhaps hundreds or even thousands of miles away from one another. In the event an outage occurs at the primary site, I/O may be redirected to the secondary storage device, thereby enabling continuous operations. This process may be referred to as a "failover." When the outage is corrected or repaired at the primary site, I/O may be redirected back to the primary storage device. This process may be referred to as a "failback."

After a failover occurs, updates may occur to data stored on the secondary storage device. These updates may not be propagated to the primary storage device due to the outage at the primary site. After the outage is corrected or repaired at the primary site, these updates may be mirrored back to the primary storage device before production can resume to the primary storage device. This process of mirroring updates back to the primary storage device can be a very time-consuming process, taking on the order of hours or even days, depending on the length of the outage and/or how much data was written to the secondary storage device during the outage. During this time period, production typically cannot be resumed at the primary site.

In view of the foregoing, systems and methods are needed to accelerate recovery in data replication environments. In particular, systems and methods are needed to more quickly resume production at a primary site after an outage at the primary site has been corrected. Further needed are systems and methods to reduce an amount of bandwidth needed to resynchronize a primary storage device with a secondary storage device after an outage has been corrected.

SUMMARY

The invention has been developed in response to the present state of the art and, in particular, in response to the problems and needs in the art that have not yet been fully solved by currently available systems and methods. Accordingly, the invention has been developed to provide systems and methods to accelerate recovery in data replication environments. The features and advantages of the invention will become more fully apparent from the following description and appended claims, or may be learned by practice of the invention as set forth hereinafter.

Consistent with the foregoing, a method for accelerating recovery in a data replication environment is disclosed herein. In one embodiment, such a method includes maintaining a secondary out-of-sync bitmap for a secondary volume. The secondary out-of-sync bitmap indicates which storage elements on the secondary volume are not synchronized with storage elements on a primary volume. The method further generates, for the primary volume, a tracking bitmap indicating which storage elements on the primary volume need to be updated with data from the secondary volume. This tracking bitmap is initialized with values from the secondary out-of-sync bitmap. Upon receiving a write from the secondary volume to a storage element on the primary volume, the method resets the corresponding bit in the tracking bitmap. Upon receiving a write from a host system to a storage element on the primary volume, the method also resets the corresponding bit in the tracking bitmap.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
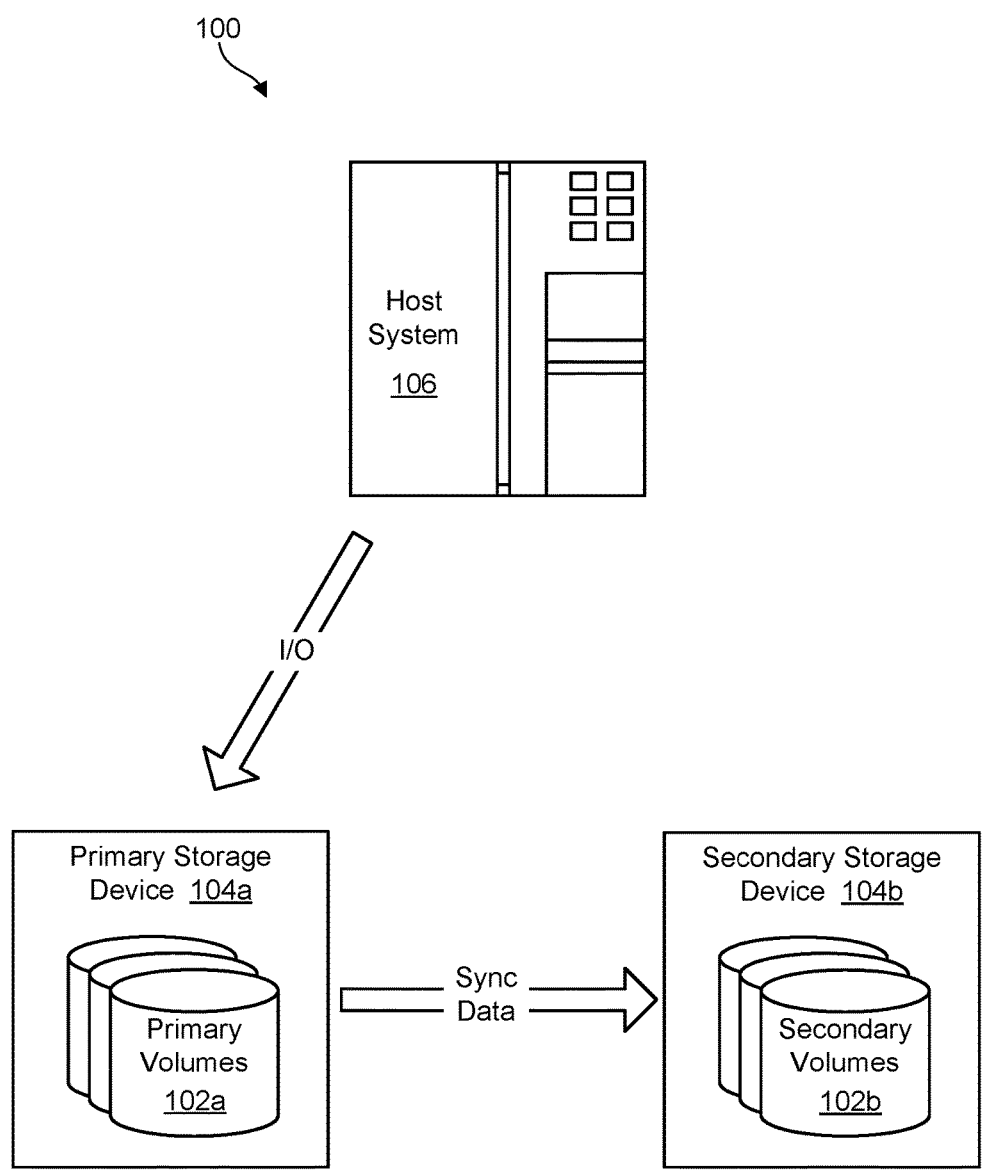
FIG. 1 is a high-level block diagram showing one example of a data replication environment during normal operation.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one example of a data replication system 100, in this embodiment a Peer-to-Peer-Remote-Copy ("PPRC") or Extended Remote Copy ("XRC") system 100, is illustrated. The data replication system 100 is presented to show an example of an architecture in which embodiments of the invention may operate, and is not intended to be limiting. In general, the data replication system 100 establishes a mirroring relationship between one or more primary volumes 102*a* and one or more secondary volumes 102*b*. Once this relationship is established, a consistent copy of data is maintained on the volumes 102*a*, 102*b*. The primary and secondary volumes 102*a*, 102*b* may be located on the same storage device 104, although the volumes 102*a*, 102*b* are typically located on separate storage devices 104*a*, 104*b* located some distance (e.g., several miles to thousands of miles) from one another. Channel extension equipment may be located between the storage devices 104*a*, 104*b*, as needed, to extend the distance over which the storage devices 104*a*, 104*b* may communicate.

The data replication system 100 may, in certain embodiments, be configured to operate in either a synchronous or asynchronous manner. When operating synchronously, an I/O may only be considered complete when it has completed successfully on both the primary and secondary storage devices 104a, 104b. As an example, in such a configuration, a host system 106 may initially send a write request to the primary storage device 104a. This write operation may be performed on the primary storage device 104a. The primary storage device 104a may, in turn, transmit a write request to the secondary storage device 104b. The secondary storage device 104b may execute the write operation and return a write acknowledge signal to the primary storage device 104a. Once the write has been performed on both the primary and secondary storage devices 104a, 104b, the primary storage device 104a returns a write acknowledge signal to the host system 106. The I/O is only considered complete when the host 106 receives the write acknowledge signal.

By contrast, asynchronous operation may only require that the write complete on the primary storage device 104a before the write is considered complete. That is, a write acknowledgement may be returned to the host system 106 when the write has completed on the primary storage device 104a, without requiring that the write also be completed on the secondary storage device 104b. The write may then be mirrored to the secondary storage device 104b as time and resources allow to create a consistent copy on the secondary storage device 104b.

Figure 2:
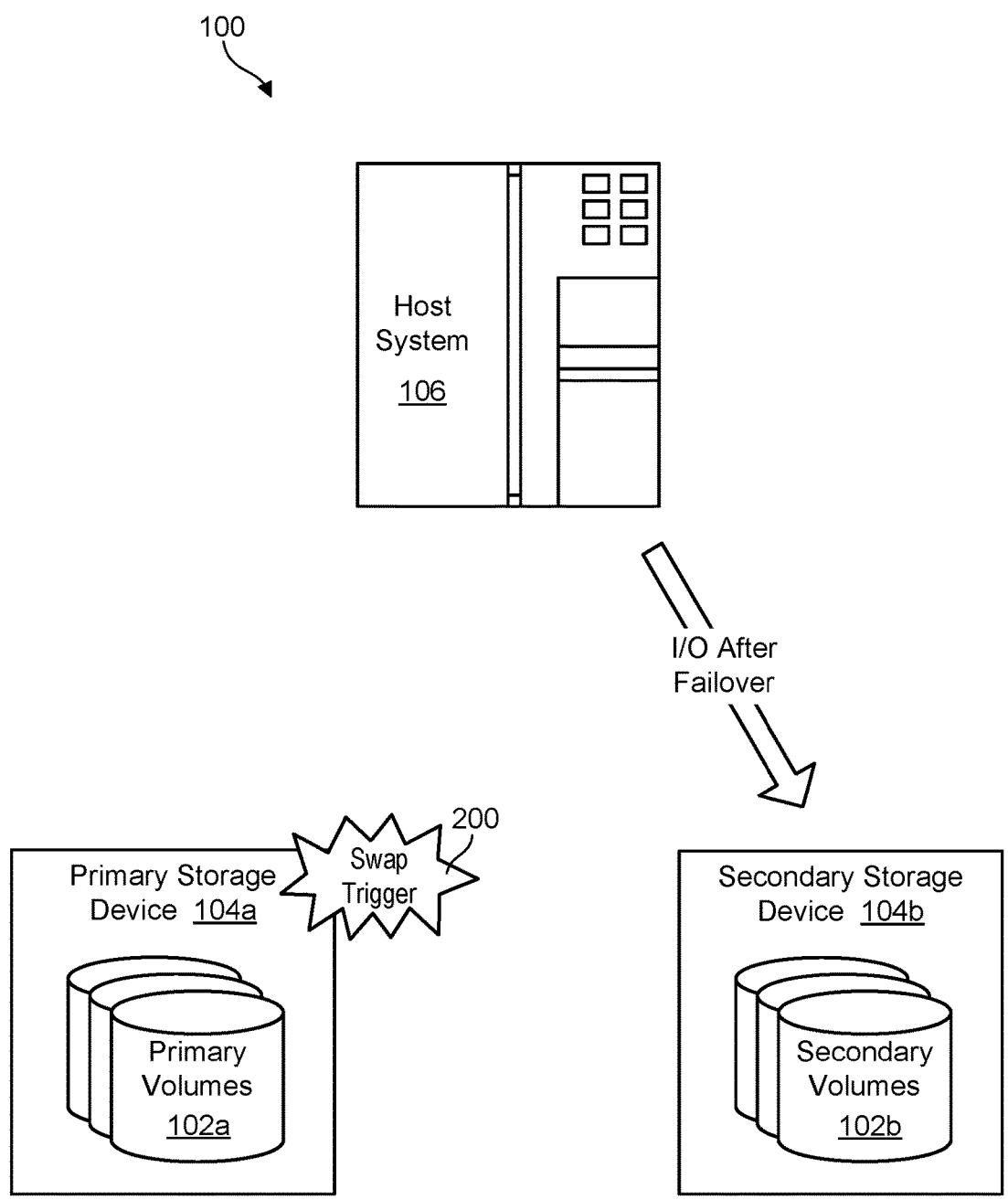
FIG. 2 is a high-level block diagram showing the data replication environment of FIG. 1 after a failover has occurred.

Referring to FIG. 2, in the event the primary storage device 104a or other functionality at the primary site fails or suffers an outage, may be redirected to the secondary storage device 104b to enable continuous operations. This process may be referred to as a failover. Any event or outage which initiates a failover may be referred to as a swap trigger 200. Since the secondary storage device 104b contains a consistent copy of the data on the primary storage device 104a, the redirected I/O (e.g., reads and writes) may be performed on the copy of the data on the secondary storage device 104b. After a failover occurs, updates may occur to data stored on the secondary storage device 104b. These updates may not be propagated to the primary storage device 104a due to the outage at the primary site.

Figure 3:
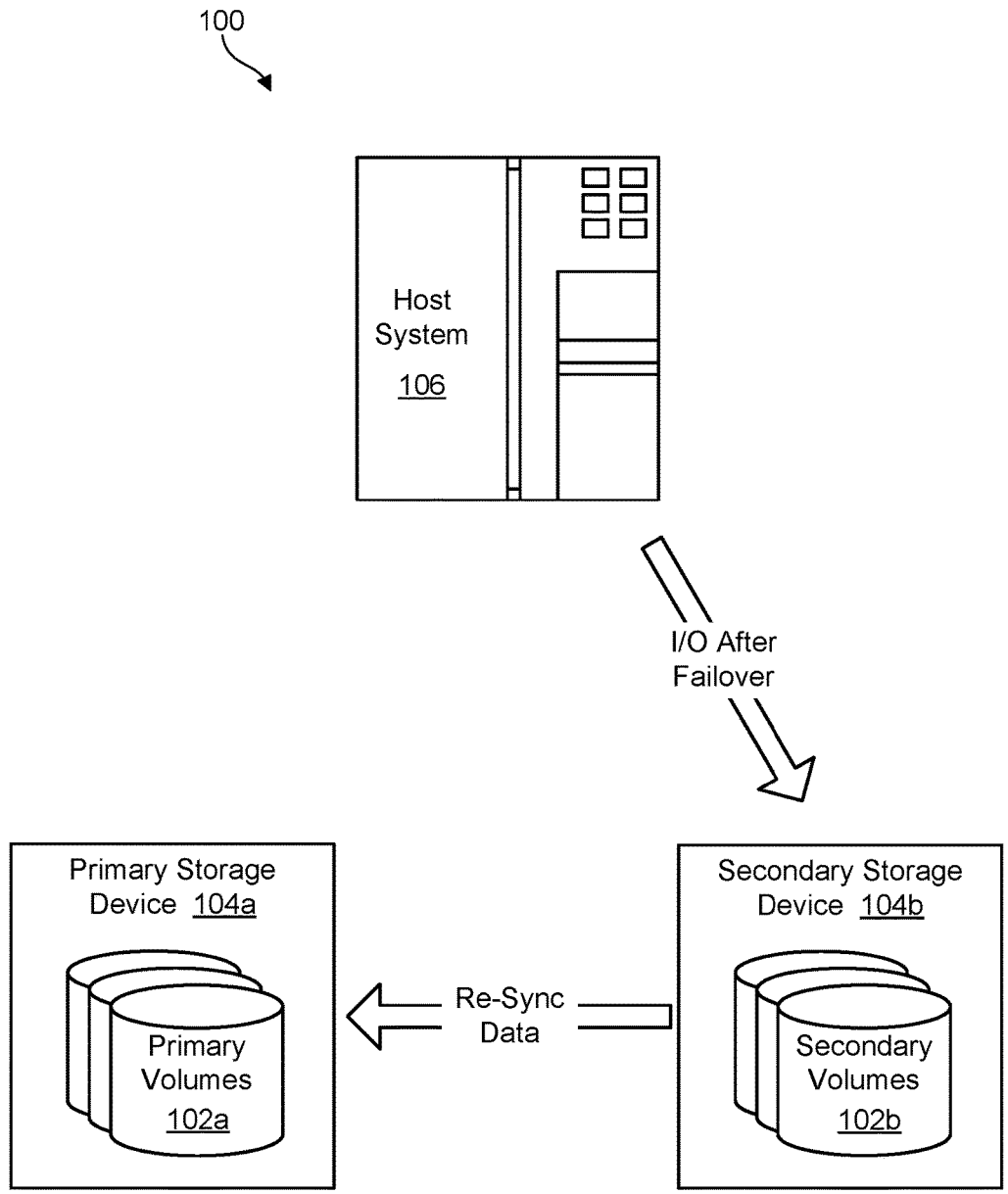
FIG. 3 is a high-level block diagram showing the data replication environment of FIG. 1 after an outage at the primary site has been corrected.

Referring to FIG. 3, after the outage is corrected or repaired at the primary site, the updates that were made to the secondary storage device 104b may be mirrored back to the primary storage device 104a before production can resume to the primary storage device 104a. This process of mirroring updates back to the primary storage device 104a can be a very time-consuming process, taking on the order of hours or even days, depending on the length of the outage and/or how much data was written to the secondary storage device 104b during the outage. During this time period, production typically cannot be resumed at the primary site. When all updates to the secondary storage device 104b are successfully mirrored to the primary storage device 104a, production may be restarted at the primary site. This will ideally allow the data replication system 100 to return to normal operation as illustrated in FIG. 1.

Referring generally to FIGS. 4 through 8, an improved technique is shown to accelerate recovery in a data replication system 100 after a failover has occurred and the outage has been corrected. Once an outage at the primary site has been corrected, the improved technique enables production at the primary site to be quickly resumed. This technique also advantageously reduces an amount of bandwidth needed to resynchronize a primary storage device with a secondary storage device.

Figure 4:
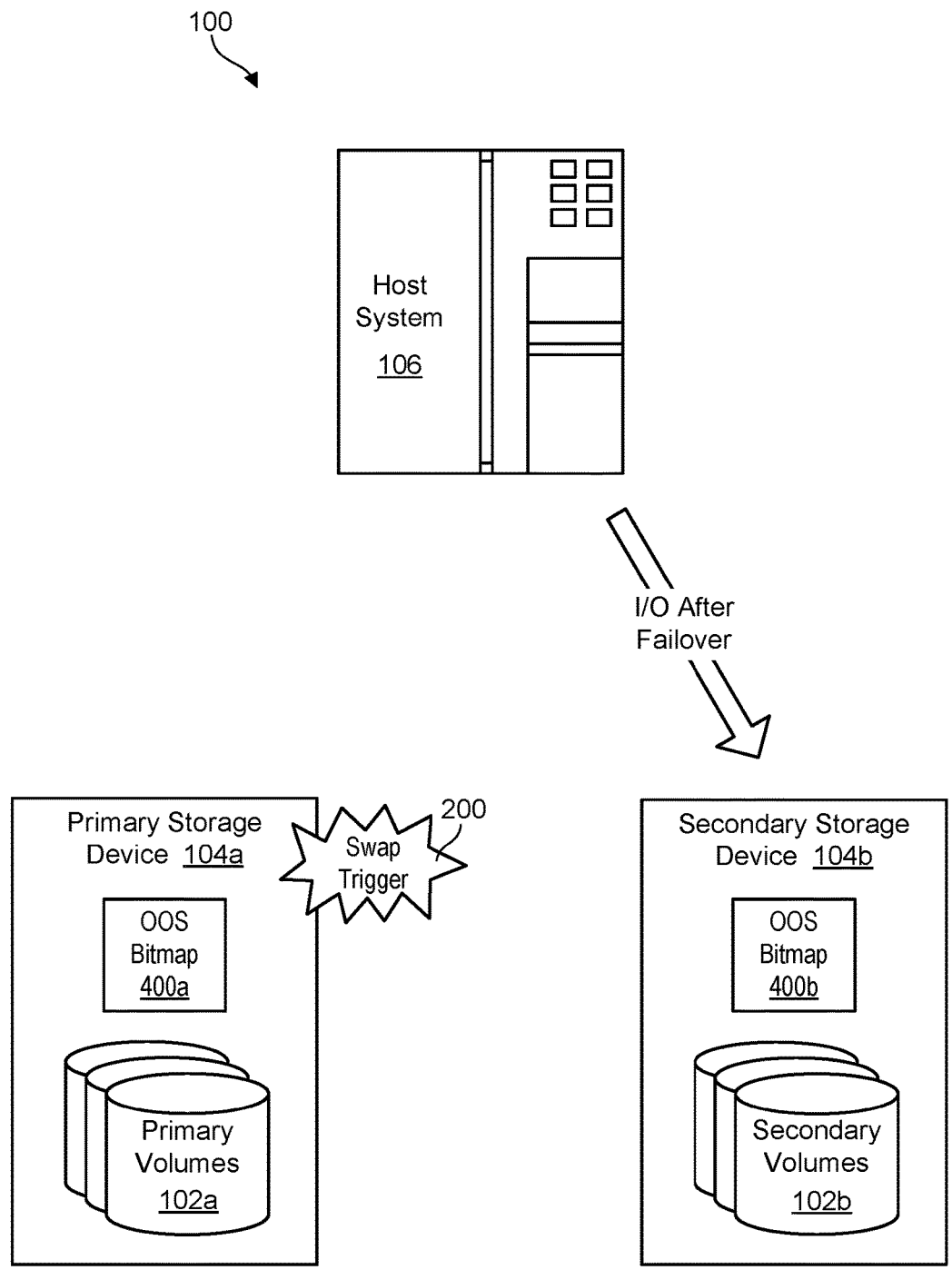
FIG. 4 is a high-level block diagram showing use of out-of sync bitmaps at the primary site and secondary site after a failover has occurred.

Referring to FIG. 4, in order to accelerate recovery in a data replication system 100, an improved system and method in accordance with the invention may utilize out-of sync bitmaps 400 on the primary and secondary storage devices 104a, 104b. For the purposes of this disclosure, the out-of sync bitmap 400 on the primary storage device 104a will be referred to as the primary out-of-sync bitmap 400a, and the out-of sync bitmap 400 on the secondary storage device 104b will be referred to as the secondary out-of-sync bitmap 400b. The primary out-of-sync bitmap 400a may be used to keep track of storage elements (e.g., tracks) that have been updated on the primary storage device 104a but not yet replicated to the secondary storage device 104b. Similarly, the secondary out-of-sync bitmap may be used to keep track of storage elements that have been updated on the secondary storage device 104b but not yet replicated to the primary storage device 104a. The primary out-of-sync bitmap 400a and secondary out-of-sync bitmap 400b may include a bit for each storage element on the primary volume 102a and secondary volume 102b respectively. In certain embodiments, an out-of sync bitmap 400 may be maintained for each volume on the primary storage device 104a and secondary storage device 104b. In other embodiments, an out-of sync bitmap 400 may be provided for multiple volumes.

When a failover occurs, as shown in FIG. 4, updates may be made to the secondary volume 102b that are not replicated to the corresponding primary volume 102a (since the primary volume 102a has experienced an outage). When updates are made to storage elements of the secondary volume 102b, the corresponding bits may be set in the secondary out-of-sync bitmap 400b to keep track of which storage elements need to be copied over to the primary volume 102a if and when the outage is corrected.

Figure 5:
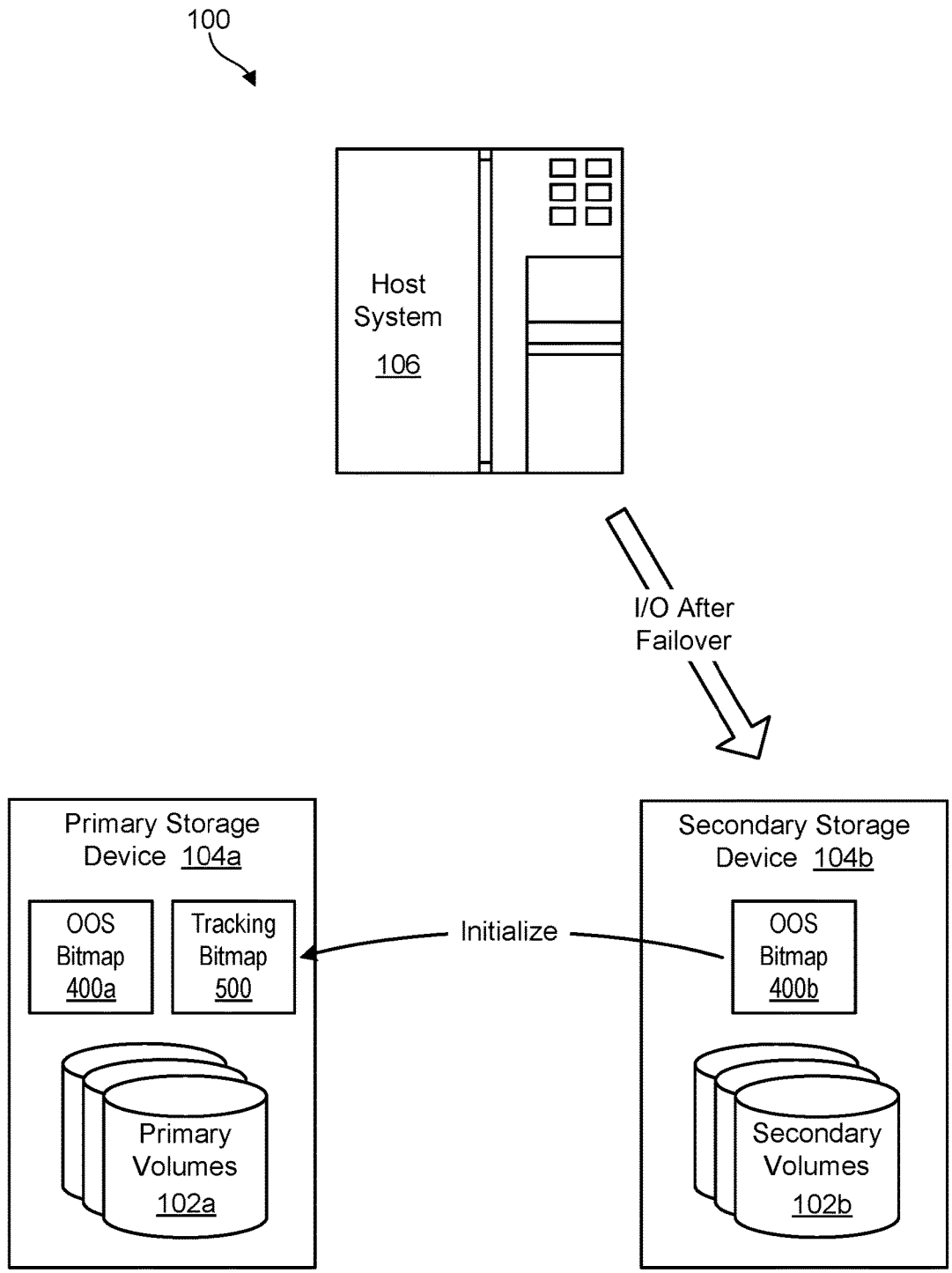
FIG. 5 is a high-level block diagram showing the creation of a tracking bitmap at the primary site and the initialization of the tracking bitmap to reflect data in the secondary out-of sync bitmap.

Referring to FIG. 5, after an outage has been corrected at the primary site, the primary volume 102a may need to be resynchronized with the secondary volume 102b so that it contains the most recent version of data. When this resynchronization process is initiated (in response to, for example, a resync command), a new tracking bitmap 500 may be created on the primary storage device 104a. Like the primary out-of-sync bitmap 400a, this tracking bitmap 500 may include a bit for each storage element in the primary volume 102a. In certain embodiments, the tracking bitmap 500 may be initialized with data in the secondary out-of-sync bitmap 400b. Thus, the tracking bitmap 500 may contain information indicating which storage elements on the secondary volume 102b were updated but not yet copied to the primary volume 102a.

Figure 6:
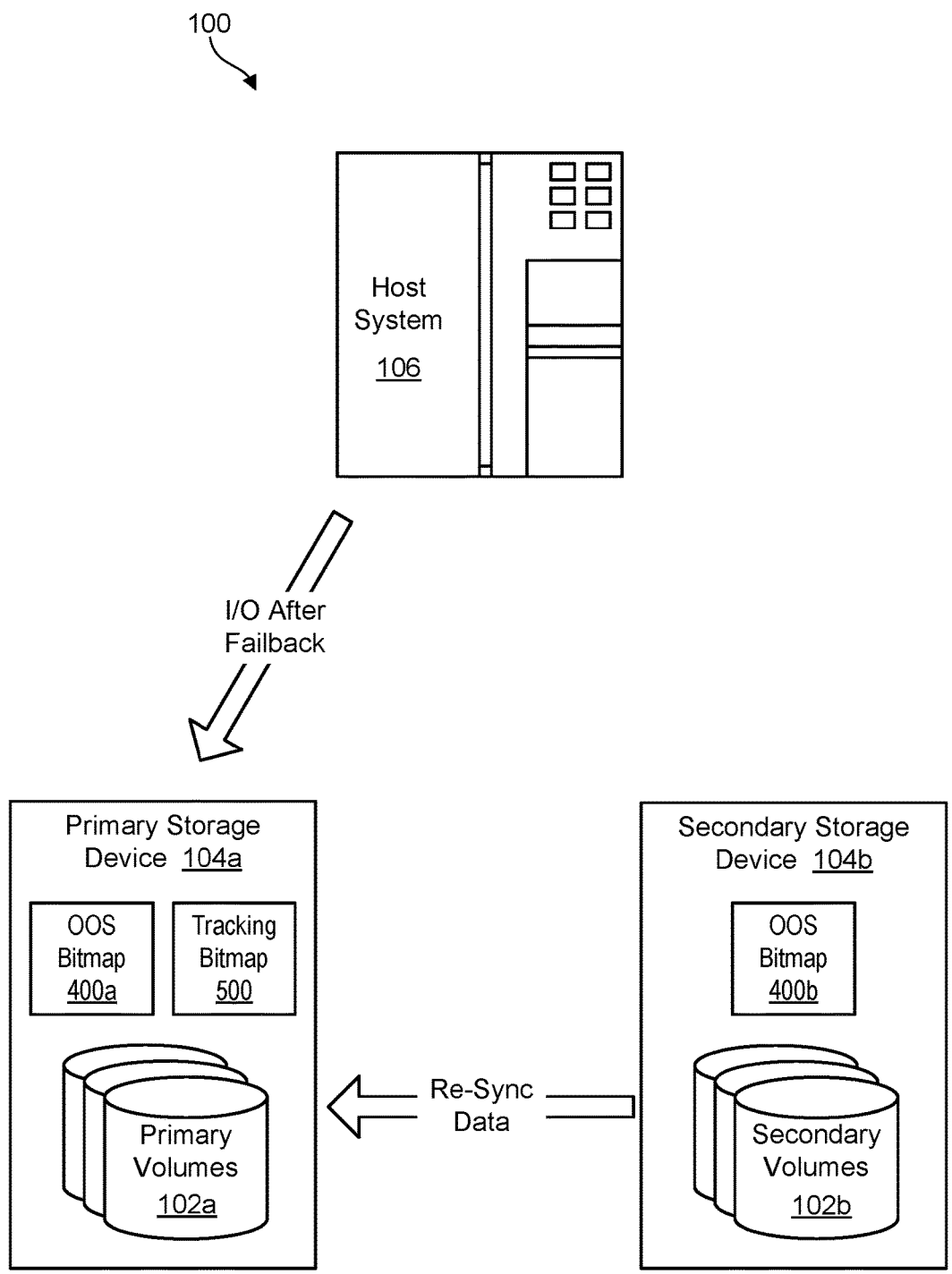
FIG. 6 is a high-level block diagram showing the resumption of I/O the primary storage device while the primary storage device is being re-synchronized with the secondary storage device.

Referring to FIG. 6, once the tracking bitmap 500 has been created and initialized, production may resume to the primary volume 102a, even if the primary volume 102a has not been fully re-synchronized with the secondary volume 102b. That is, I/O may resume to the primary volume 102a before it has been fully updated with data from the secondary volume 102b. This represents a significant advance in the art and allows production to be resumed at a primary site in an accelerated manner. Using the tracking bitmap 500, I/O may be redirected to the primary volume 102a while the primary volume 102a is being resynchronized with the secondary volume 102b.

After production has resumed at the primary site, the tracking bitmap 500 may be used keep track of writes to the primary volume 102a. When a host system 106 writes to a storage element in the primary volume 102a, this storage element will contain the most recent copy of the data. Thus, this data no longer needs to be copied from the secondary volume 102b to the primary volume 102a. Thus, when a host system 106 writes data to the primary volume 102a, the corresponding bit(s) in the tracking bitmap 500 may be reset to indicate that this data not longer needs to be copied from the secondary volume 102b to the primary volume 102a. In the event this data is nevertheless received from the secondary volume 102b, the data may be rejected since the primary volume 102a already has the most recent version of the data. In certain embodiments, the primary storage device 104a may return an indicator (e.g., a reason code, etc.) to the secondary storage device 104b indicating that the data is no longer needed so that the secondary storage device 104b can reset the corresponding bit(s) in the secondary out-of-sync bitmap 400b. The primary storage device 104a may also set the corresponding bit(s) in the primary out-of-sync bitmap 400a, thereby indicating that data in the corresponding storage elements needs to be copied from the primary volume 102a to the secondary volume 102b.

After production has resumed at the primary site, updates made to the secondary volume 102b during the outage may be mirrored back to the primary volume 102a. When updates are received by the primary volume 102a from the secondary volume 102b, the primary storage device 104a may reset the corresponding bit(s) in the tracking bitmap 500 to indicate that the most recent version of the data is stored on the primary volume 102a. The primary storage device 104a may also return an acknowledgement to the secondary storage device 104b indicating that the updates have been written to the primary volume 102a. This allows the secondary storage device 104b to reset the corresponding bit(s) in the secondary out-of-sync bitmap 400b, thereby preventing the storage elements from being copied again.

Figure 7:
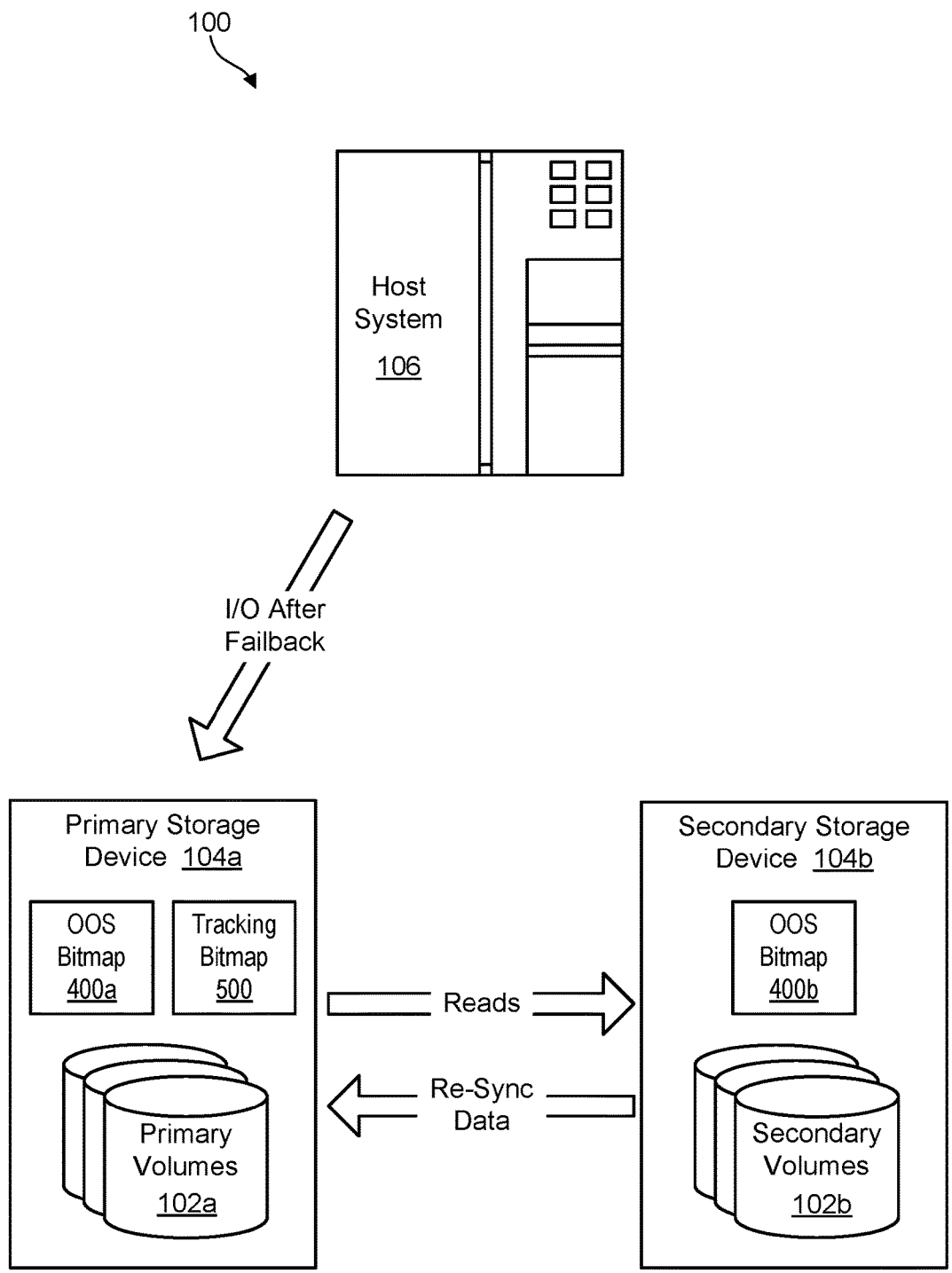
FIG. 7 is a high-level block diagram showing the redirection of some reads from the primary storage device to the secondary storage device during the re-synchronization synchronization process.

Referring to FIG. 7, when a host system 106 attempts to read data on the primary volume 102a, the primary storage device 104a may check the tracking bitmap 500 to determine if the most recent copy of the data is stored in the primary volume 102a, or if the data still resides solely on the secondary volume 102b. If the most recent data is not in the primary volume 102a, the primary storage device 104a may retrieve the most recent data from the secondary volume 102b and return this data to the host system 106. At this time, the data may also be written to the primary volume 102a and the corresponding bit(s) may be reset in the tracking bitmap 500 to indicate that the primary volume 102a stores the most recent copy of the data. In this way, reads may be processed before the primary volume 102a is fully re-synchronized with the secondary volume 102b.

Figure 8:
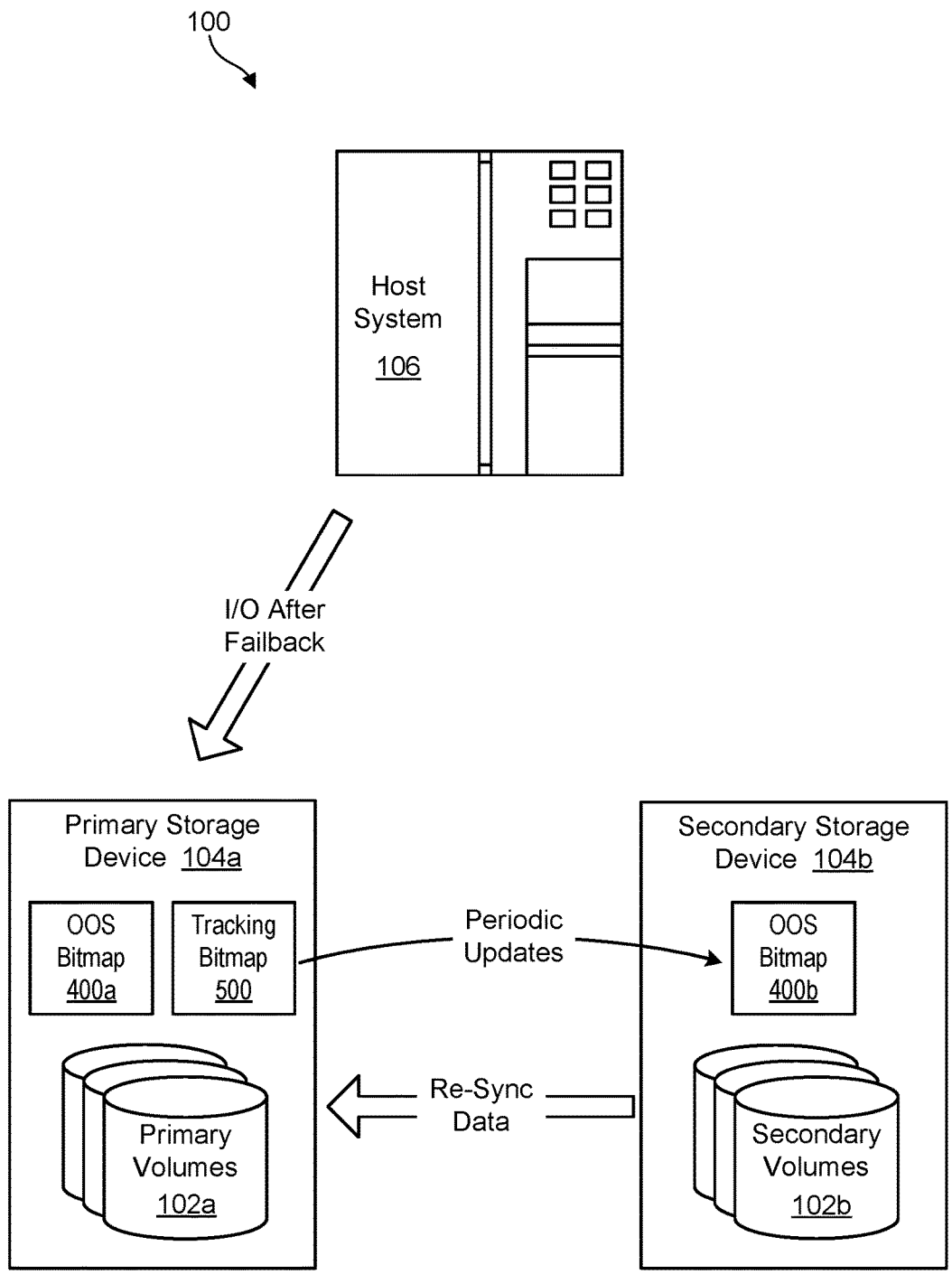
FIG. 8 is a high-level block diagram showing periodically transmitting the tracking bitmap from the primary storage device to the secondary storage device to update the secondary out-of sync bitmap.

Referring to FIG. 8, as the primary volume 102a receives writes from the host system 106 and these writes are recorded in the tracking bitmap 500, the tracking bitmap 500 may become less synchronized with the secondary out-of-sync bitmap 400b. That is, the secondary out-of-sync bitmap 400b may indicate that certain data needs to be copied when in fact the primary volume 102a already contains the most recent version of the data. In such cases, the data on the secondary volume 102b no longer needs to be copied to the primary volume 102a. To synchronize the tracking bitmap 500 and secondary out-of-sync bitmap 400b, the tracking bitmap 500 may, in certain embodiments, be periodically transmitted from the primary storage device 104a to the secondary storage device 104b in order to update the secondary out-of-sync bitmap 400b. Upon receiving the tracking bitmap 500, the secondary storage device 104b may, in certain embodiments, update the secondary out-of-sync bitmap 400b by performing an AND operation between the tracking bitmap 500 and the secondary out-of-sync bitmap 400b. Updating the secondary out-of-sync bitmap 400b will reduce the amount of data that is unnecessarily sent from the secondary storage device 104b to the primary storage device 104a, thereby preserving bandwidth.

In other embodiments, instead of periodically sending the entire tracking bitmap 500 to the secondary storage device 104b, the primary storage device 104a may send a message to the secondary storage device 104b each time the host system 106 writes data to the primary volume 102a. This will enable the secondary storage device 104b to update the secondary out-of-sync bitmap 400b accordingly.

Although the systems and methods disclosed herein have been discussed primarily in association with PPRC and XRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for accelerating recovery in a data replication environment, the method comprising:
   maintaining, for a secondary volume, a secondary out-of-sync bitmap indicating which storage elements on the secondary volume are not synchronized with storage elements on a primary volume;
   generating, for the primary volume, a tracking bitmap indicating which storage elements on the primary volume need to be updated with data from the secondary volume;
   initially synchronizing the tracking bitmap with the secondary out-of-sync bitmap;
   after the tracking bitmap is initially synchronized with the secondary out-of-sync bitmap, but before the storage elements on the primary volume are fully synchronized with the storage elements on the secondary volume, resuming I/O from a host system to the primary volume;
   upon receiving a write from the secondary volume to a storage element on the primary volume, resetting the corresponding bit in the tracking bitmap; and
   upon receiving a write from a host system to a storage element on the primary volume, resetting the corresponding bit in the tracking bitmap.

2. The method of claim 1, further comprising, upon receiving a write from the host system to a storage element on the primary volume, updating a primary out-of-sync bitmap associated with the primary volume.

3. The method of claim 1, further comprising, upon receiving a write from the secondary volume to a storage element on the primary volume, rejecting the write if the corresponding bit is already reset in the tracking bitmap.

4. The method of claim 3, further comprising, upon rejecting the write, returning, from the primary volume to the secondary volume, a reason code indicating that a corresponding bit in the secondary out-of-sync bitmap should be reset.

5. The method of claim 1, further comprising, in the event a read is received by the primary volume for a storage element whose bit is not yet reset in the tracking bitmap, performing the read at the secondary volume.

6. The method of claim 5, further comprising writing data associated with the read to the primary volume and resetting the corresponding bit in the tracking bitmap.

7. The method of claim 1, further comprising periodically sending the tracking bitmap from the primary volume to the secondary volume to update the secondary out-of-sync bitmap.

8. A computer program product for accelerating recovery in a data replication environment, the computer program product comprising a non-transitory computer-readable storage medium having computer-usable program code embodied therein, the computer-usable program code comprising:
    computer-usable program code to maintain, for a secondary volume, a secondary out-of-sync bitmap indicating which storage elements on the secondary volume are not synchronized with storage elements on a primary volume;
    computer-usable program code to generate, for the primary volume, a tracking bitmap indicating which storage elements, on the primary volume, need to be updated with data from the secondary volume;
    computer-usable program code to initially synchronize the tracking bitmap with the secondary out-of-sync bitmap;
    computer-usable program code to, after the tracking bitmap is initially synchronized with the secondary out-of-sync bitmap, but before the storage elements on the primary volume are fully synchronized with the storage elements on the secondary volume, resume I/O from a host system to the primary volume;
    computer-usable program code to, upon receiving a write from the secondary volume to a storage element on the primary volume, reset the corresponding bit in the tracking bitmap; and
    computer-usable program code to, upon receiving a write from a host system to a storage element on the primary volume, reset the corresponding bit in the tracking bitmap.

9. The computer program product of claim 8, further comprising computer-usable program code to, upon receiving a write from the host system to a storage element on the primary volume, update a primary out-of-sync bitmap associated with the primary volume.

10. The computer program product of claim 8, further comprising computer-usable program code to, upon receiving a write from the secondary volume to a storage element on the primary volume, reject the write if the corresponding bit is already reset in the tracking bitmap.

11. The computer program product of claim 10, further comprising computer-usable program code to, upon rejecting the write, return, from the primary volume to the secondary volume, a reason code indicating that a corresponding bit in the secondary out-of-sync bitmap should be reset.

12. The computer program product of claim 8, further comprising computer-usable program code to, in the event a read is received by the primary volume for a storage element whose bit is not yet reset in the tracking bitmap, perform the read at the secondary volume.

13. The computer program product of claim 12, further comprising computer-usable program code to write data associated with the read to the primary volume and reset the corresponding bit in the tracking bitmap.

14. The computer program product of claim 8, further comprising computer-usable program code to periodically send the tracking bitmap from the primary volume to the secondary volume to update the secondary out-of-sync bitmap.

15. A system for accelerating recovery in a data replication environment, the system comprising:
    at least one processor;
    at least one memory device coupled to the at least one processor and storing instructions for execution on the at least one processor, the instructions causing the at least one processor to:
        maintain, for a secondary volume, a secondary out-of-sync bitmap indicating which storage elements on the secondary volume are not synchronized with storage elements on a primary volume;
        generate, for the primary volume, a tracking bitmap indicating which storage elements, on the primary volume, need to be updated with data from the secondary volume;
        initially synchronize the tracking bitmap with the secondary out-of-sync bitmap;
        after the tracking bitmap is initially synchronized with the secondary out-of-sync bitmap, but before the storage elements on the primary volume are fully synchronized with the storage elements on the secondary volume, resume I/O from a host system to the primary volume;
        upon receiving a write from the secondary volume to a storage element on the primary volume, reset the corresponding bit in the tracking bitmap; and
        upon receiving a write from a host system to a storage element on the primary volume, reset the corresponding bit in the tracking bitmap.

16. The system of claim 15, wherein the instructions further cause the at least one processor to, upon receiving a write from the host system to a storage element on the primary volume, update a primary out-of-sync bitmap associated with the primary volume.

17. The system of claim 15, wherein the instructions further cause the at least one processor to, upon receiving a write from the secondary volume to a storage element on the primary volume, reject the write if the corresponding bit is already reset in the tracking bitmap.

18. The system of claim 17, wherein the instructions further cause the at least one processor to, upon rejecting the write, return, from the primary volume to the secondary volume, a reason code indicating that a corresponding bit in the secondary out-of-sync bitmap should be reset.

19. The system of claim 15, wherein the instructions further cause the at least one processor to, in the event a read is received at the primary volume for a storage element whose bit is not yet reset in the tracking bitmap, perform the read at the secondary volume.

20. The system of claim 19, wherein the instructions further cause the at least one processor to write data associated with the read to the primary volume and reset the corresponding bit in the tracking bitmap.

* * * * *